United States Patent Office 2,777,244
Patented Jan. 15, 1957

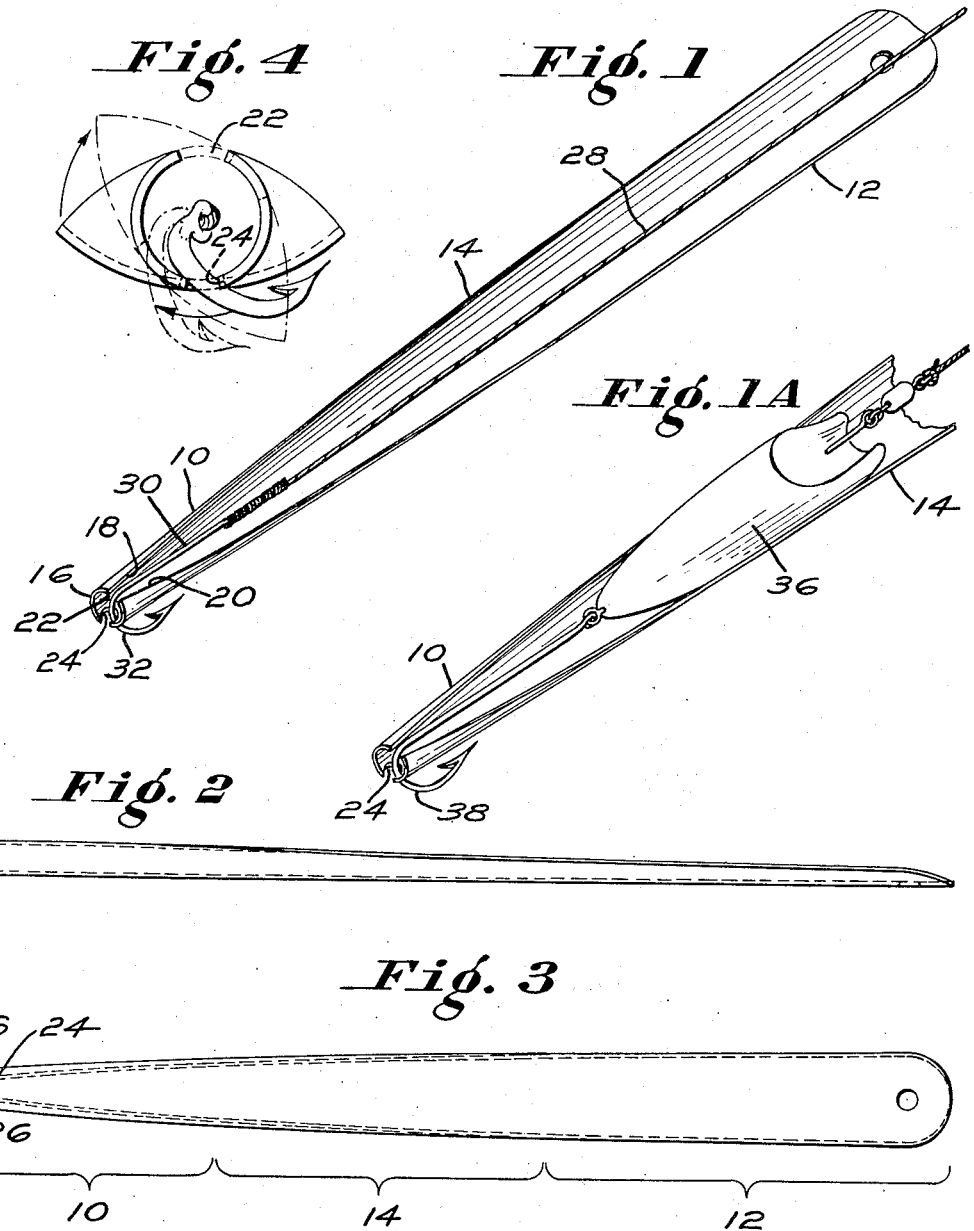

2,777,244

FISHHOOK EXTRACTOR

Ora Glenn McKinley, Houghton, N. Y.

Application September 13, 1954, Serial No. 455,644

7 Claims. (Cl. 43—53.5)

This invention relates to fishhook extractor implements and has for one of its objects the provision of an improved fishhook extractor of simple one piece construction so formed as to facilitate its use in application to and removal or disgorgement of an embedded hook whether the hook be of the single or ganged type and whether it be secured to the fishline by a conventional leader or be attached to a lure.

Another object of the invention is to provide a hook extractor instrument as aforesaid which will accommodate, and permit direct finger access to, either the leader of an ordinary fishhook or the body of a lure to which the fishhook to be extracted is attached so that in either case the hook may be firmly retained against displacement from the instrument.

Still another object of the invention is to provide an improved extractor implement which enables application of twisting and pushing motions to an embedded hook for facile disgorgement thereof from the fish with minimum injury to the latter, the construction being such that the twisting motion is readily applied in either clockwise or counterclockwise direction and the likelihood of the hook slipping from the instrument during the operation being minimized.

A further object of the invention is to provide a hook extractor as aforesaid which is inexpensive to manufacture. Other objects of the invention will be apparent from the following description and claims, and from the drawing, wherein:

Fig. 1 is a perspective view of a fishhook extractor embodying the invention, as applied to an ordinary hook as for extracting manipulation of the same;

Fig. 1A is a fragmentary perspective view showing a hook extractor instrument similar to that of Fig. 1, as applied to the hook of an artificial lure;

Fig. 2 is an elevation view of a fishhook extractor of the form shown in Figs. 1 and 1A;

Fig. 3 is a bottom plan view of the same; and

Fig. 4 is an end view of the instrument with a hook engaged therein, showing the application of a twisting force to the hook by the instrument.

Referring more particularly to the drawing, a preferred embodiment of the invention is illustrated wherein the fishhook extractor implement consists of a single elongate element having a hollow generally frusto-conical nose portion 10 at one end, a concavo, convex handle portion 12 at its other end, and a central concavo-convex body portion 14. As shown in the drawing, the instrument may be in the form of an elongate strip of sheet material shaped with a cross-sectional curvature which is greatest at the nose end 16 of the instrument, whereat the edges 18, 20 of the strip element approach each other closely to provide a narrow opening 22 in the otherwise closed frusto-conical form of the nose wall, this curvature decreasing throughout the length of the instrument through intermediate degrees in the body portion 14 to that of a more nearly flat form in the handle portion 12. Conversely, the edges 18, 20 of the material spread rapidly from their relation of inturned close approach to each other at the nose end of the tool to form the side edges in the body and handle portions of the instrument as shown.

Thus the implement has a narrow nearly closed hook shank embracing tubular form at its nose, a concave thumb or lure receiving cradle configuration in its central body portion and a similar but less pronounced, hand palm fitting curvature in the handle portion. While narrowed as compared to the body and handle portions of the tool, the nose portion 10 is provided with a relatively blunt end, preferably open as shown, and the tubular wall thereof is notched at 24 in the end edge opposite the opening or slot 22. The opening or neck 26 of the notch is dimensioned to admit the bowed end of a fishhook but is restricted so as to retain the same against accidental dislodgement from the notch, as will appear more fully hereinafter.

In use, the implement of the invention may be passed along the fishing line 28 (Fig. 1) until the nose portion 10 of the tool embraces the shank 30 of the embedded hook with the bow 32 thereof engaged in the notch 24. Then with the thumb of the user pressing the line or hook leader 28 tightly into the concave cradle formation of the implement body portion 14 to maintain the same taut and the convex back of the handle portion 12 firmly grasped in the user's hand, a firm pushing movement together with a twisting action as shown in Fig. 4 may be executed whereby the hook is freed from its set position in the fish. As shown, the hook engaging notch 24 embraces the bend or bow 32 of the hook loosely so as to permit the hook to assume a trailing canted position for easier removal from the fish irrespective of the direction of the twisting movement, while the restriction at the notch entrance 26 serves to retain the hook in the notch.

Referring to Fig. 1A it will be seen that the method of use of the instrument where the hook is attached to an artificial lure is substantially the same as described above, the body portion 14 of the instrument accommodating the lure 36 and cradling the same for firm application of finger pressure thereto for retention of the hook 38 of the lure in its position of engagement in the notch 24.

It will be appreciated that the hook extractor instrument of the invention is readily applied to a hook when the latter is embedded in a fish in that the nose portion forms a nearly closed line embracing passage way for guiding the instrument along the fishing line and leader to a deeply swallowed hook. Where the instrument is used with a lure which precludes such threading along the line the open slot formation 22 provides ready access for fitting the instrument over the shank of the embedded hook even when the latter is not directly accessible.

The instrument is also secure in use in that the hook is secured in the notch 24 by the restricted opening of the latter for application of twisting forces in either direction. Further the body portion 14 provides a cradle for application of direct finger pressure on the element directly next to the hook, whether it be a leader or a lure, and thus the hook is readily maintained securely seated in the hook receiving notch 24. Further the palm fitting curvature of the handle portion provides for comfortable secure gripping of the instrument.

Finally, the instrument of the invention is inexpensive to manufacture and yet rugged and durable. Thus the tool has no moving parts and may be manufactured from a single piece of sheet form material shaped in a simple configuration which is essentially a channel form, thereby possessing the strength of that cross-section in addition to the specific useful features aforementioned.

While only one form of the invention has been illustrated and described in detail it will be understood that the invention is not so limited but may be otherwise embodied within the scope of the appended claims.

I claim:
1. A fishhook extractor implement comprising an elongate generally channel shaped member having a nose portion and a body portion and a handle portion, said nose portion being of a generally frustro-conical shape formed by the legs of the channel member being inturned toward and into close approach to each other at the nose end of said member, said body portion of said channel member being of open concavo-convex cross-section, and said handle portion being of relatively flat concavo-convex cross-section, the cross-sectional curvature of said member being progressively less from said nose end to the handle end of said member to provide an uninterrupted transition of shape between adjacent portions of said member, and said nose end being formed with a notch in the base wall of the channel member having a restricted entrance opening at the nose edge of said channel adapted to pass the bowed portion of a fishhook and a relatively wider portion extending inwardly therefrom adapted to embrace the fishhook at its bowed portion.

2. A fishhook extractor implement comprising an elongate member having an implement nose portion at one end and a handle portion at its other end and an intermediate body portion, said member having the form of a square ended strip of material with the corners of the square end turned upwardly and inwardly into close proximity to each other at the nose end of the implement to impart a slotted frustro-conical form to said nose portion, and with the edges of the strip spreading from said nose end and said strip being correspondingly less curved cross-sectionally toward the handle end of the implement to impart concavo-convex forms to said body and handle portions with greater and lesser degrees of concavity, respectively, and said member being formed with a fishhook bow receiving and journaling notch with a restricted opening at and opening toward the said nose end.

3. A fishhook extractor implement comprising an elongate member having an implement nose portion at one end and a handle portion at its other end and an intermediate body portion, said member having the form of a square ended strip of material with the corners of the square end turned upwardly and inwardly into close proximity to each other at the nose end of the implement to impart a slotted frustro-conical form to said nose portion, and with the edges of the strip spreading from said nose end and said strip being correspondingly less curved cross-sectionally toward the handle end of the implement to impart concavo-convex forms to said body and handle portions with greater and lesser degrees of concavity, respectively.

4. A fishhook extractor implement comprising an elongate member having an implement nose portion at one end and a handle portion at its other end and an intermediate body portion, said member having the form of a square ended strip of material of constant surface width throughout its length with the corners of the square end turned upwardly and inwardly into close proximity to each other at the nose end of the implement to impart a slotted frustro-conical form to said nose portion, and with the edges of the strip spreading from said nose end and said strip being correspondingly less curved cross-sectionally toward the handle end of the implement to impart concavo-convex forms to said body and handle portions with greater and lesser degrees of concavity, respectively, and said member being formed with a fish-hook bow receiving and journaling notch with a restricted opening at and opening toward the said nose end.

5. A fishhook extractor implement comprising an elongate generally channel shaped member having a nose portion and a body portion and a handle portion, said nose portion being of a generally frustro-conical shape slotted longitudinally to pass a hook shank and formed to thereafter embrace and journal the same, said nose portion being formed by the legs of the channel member being inturned toward and into close approach to each other at the nose end of said member, said body portion of said channel member being of open concavo-convex cross-section adapted to cradle the body of an artificial lure, and said handle portion being of relatively flat concavo-convex cross-section, the cross-sectional curvature of said member being progressively less from said nose end to the handle end of said member to provide an uninterrupted transition of shape between adjacent portions of said member, and said nose end being formed with a notch in the base wall of the channel member having a restricted entrance opening at the nose edge of said channel and adapted to pass the bowed portion of a fishhook and a relatively wider portion extending inwardly therefrom adapted to embrace the fishhook at its bowed portion.

6. A fishhook extractor implement comprising an elongate generally channel shaped member having a nose portion and a body portion and a handle portion, said nose portion being of a longitudinally slotted generally frustro-conical shape formed by the legs of the channel member being inturned toward and into close approach to each other at the nose end of said member, said body portion of said channel member being of open concavo-convex cross-section, and said handle portion being of relatively flat concavo-convex cross-section, the cross-sectional curvature of said member being progressively less from said nose end to the handle end of said member to provide an uninterrupted transition of shape therealong, said nose end being formed with a notch in the base wall of the channel member diametrically opposite from the longitudinal slot of the nose, and said notch having a restricted entrance opening at the nose edge of said channel and adapted to pass the bowed portion of a fishhook and a relatively wider portion extending inwardly therefrom adapted to embrace the fishhook at its bowed portion.

7. A fishhook extractor implement comprising an elongate member having an implement nose portion at one end and a handle portion at its other end and an intermediate body portion, said member having the form of a square ended strip of material with the corners of the square end turned upwardly and inwardly into close proximity to each other at the nose end of the implement to impart a slotted frustro-conical form to said nose portion, and with the edges of the strip spreading from said nose end and said strip being correspondingly less curved cross-sectionally toward the handle end of the implement to impart concavo-convex form to said body and handle portions, and said member being formed with a fishhook bow receiving and journaling notch with a restricted opening at and opening toward the said nose end.

References Cited in the file of this patent

UNITED STATES PATENTS

| | | |
|---|---|---|
| 2,586,431 | Krichbaum | Feb. 19, 1952 |
| 2,695,471 | Imberti | Nov. 30, 1954 |

FOREIGN PATENTS

| | | |
|---|---|---|
| 419,305 | Italy | Mar. 20, 1947 |
| 648,335 | France | Aug. 13, 1948 |